United States Patent
Bommi et al.

(10) Patent No.: US 8,986,544 B2
(45) Date of Patent: Mar. 24, 2015

(54) VENTED FILTER CARTRIDGE FOR WATER TREATMENT DEVICE

(75) Inventors: Govind Bommi, Bayshore Park (SG); Krishna Murthy Bommi, Bangalore (IN)

(73) Assignee: Marmon Water (Singapore) Pte. Ltd., Singapore (SG)

(*) Notice: Subject to any disclaimer, the term of this patent is extended or adjusted under 35 U.S.C. 154(b) by 545 days.

(21) Appl. No.: 12/603,505

(22) Filed: Oct. 21, 2009

(65) Prior Publication Data

US 2011/0089103 A1 Apr. 21, 2011

(51) Int. Cl.
*C02F 1/28* (2006.01)
*C02F 1/00* (2006.01)
*B01D 36/00* (2006.01)

(52) U.S. Cl.
CPC .............. *C02F 1/003* (2013.01); *B01D 36/001* (2013.01); *C02F 1/283* (2013.01); *C02F 2201/006* (2013.01); *C02F 2307/04* (2013.01)
USPC ........................... 210/282; 210/265; 210/472

(58) Field of Classification Search
CPC ....... C02F 1/003; C02F 1/283; C02F 2307/04
USPC .......................................... 210/265, 282, 472
See application file for complete search history.

(56) References Cited

U.S. PATENT DOCUMENTS

| | | | |
|---|---|---|---|
| 3,905,520 A | 9/1975 | Nishioka | |
| 3,955,720 A | 5/1976 | Malone | |
| 3,972,694 A | 8/1976 | Head | |
| 4,054,526 A | 10/1977 | Muller | |
| 4,113,147 A | 9/1978 | Frazier et al. | |
| 4,151,092 A | 4/1979 | Grimm et al. | |
| 4,212,743 A | 7/1980 | Van Meter et al. | |
| 4,238,054 A | 12/1980 | Chen | |
| 4,298,475 A | 11/1981 | Gartner | |
| 4,306,971 A * | 12/1981 | Hankammer | 210/282 |
| 4,310,104 A | 1/1982 | Takatsuki | |

(Continued)

FOREIGN PATENT DOCUMENTS

| | | |
|---|---|---|
| JP | 45-000637 B1 | 1/1970 |
| JP | 62-132586 A | 6/1987 |

(Continued)

OTHER PUBLICATIONS

International Search Report and Written Opinion issued Oct. 21, 2008, in connection with PCT/IB07/54115.

(Continued)

*Primary Examiner* — Tony G Soohoo
*Assistant Examiner* — Peter Kayworth
(74) *Attorney, Agent, or Firm* — Robert Curcio; DeLio, Peterson & Curcio, LLC

(57) ABSTRACT

A filter cartridge has a shell defining an upper portion with an upper interior volume and a lower portion with a lower interior volume. The cartridge is for use in gravity-fed water treatment systems having an upper untreated supply and a lower filtered container. A hydrophilic porous particulate carbon powder block filter in a polymeric binder is disposed in the cartridge. The filter has a central opening and is open on both ends. The top end of the block is fitted with an air vent tube. The lower end of the block is fitted into a rubber gasket to direct water flow into the lower container. As water flows through the filter cartridge, air is vented through the block filter central opening and out through the vent tube.

14 Claims, 2 Drawing Sheets

(56) References Cited

U.S. PATENT DOCUMENTS

| | | | |
|---|---|---|---|
| 4,359,174 A | 11/1982 | Ikunosuke et al. | |
| 4,636,307 A | 1/1987 | Inoue et al. | |
| 4,798,671 A | 1/1989 | Mijers et al. | |
| 4,995,976 A | 2/1991 | Vermes et al. | |
| 5,024,764 A | 6/1991 | Holler | |
| 5,045,195 A | 9/1991 | Spangrud et al. | |
| 5,120,438 A | 6/1992 | Nakagawa et al. | |
| 5,167,819 A | 12/1992 | Iana et al. | |
| 5,225,078 A * | 7/1993 | Polasky et al. | 210/264 |
| 5,268,093 A | 12/1993 | Hembree et al. | |
| 5,273,649 A | 12/1993 | Magnusson et al. | |
| 5,431,813 A | 7/1995 | Daniels | |
| 5,509,605 A | 4/1996 | Cripe | |
| 5,518,613 A | 5/1996 | Koczur et al. | |
| 5,545,315 A | 8/1996 | Lonneman | |
| 5,609,759 A | 3/1997 | Nohren, Jr. et al. | |
| 5,688,397 A | 11/1997 | Malmborg | |
| 5,733,448 A | 3/1998 | Kaura | |
| 5,919,365 A | 7/1999 | Collette | |
| 5,928,512 A | 7/1999 | Hatch et al. | |
| 6,004,460 A | 12/1999 | Palmer et al. | |
| 6,136,189 A | 10/2000 | Smith et al. | |
| 6,290,848 B1 | 9/2001 | Tanner et al. | |
| 6,395,170 B1 | 5/2002 | Hughes et al. | |
| 6,524,477 B1 | 2/2003 | Hughes | |
| 6,565,749 B1 * | 5/2003 | Hou et al. | 210/500.38 |
| 6,569,329 B1 | 5/2003 | Nohren, Jr. | |
| 6,638,426 B1 * | 10/2003 | Fritter et al. | 210/266 |
| 6,733,669 B1 | 5/2004 | Crick | |
| 2007/0215536 A1 * | 9/2007 | Bommi et al. | 210/282 |

FOREIGN PATENT DOCUMENTS

| | | |
|---|---|---|
| JP | 2002035740 A | 2/2002 |
| WO | WO 00/09448 | 2/2000 |
| WO | WO 01/09040 | 2/2001 |
| WO | WO 2005/075356 | 8/2005 |

OTHER PUBLICATIONS

Derwent Abstract Accession No. 2005-622180 for Indian Patent Publication No. IN 200401421 I4, published on Apr. 29, 2004.

* cited by examiner

VENTED FILTER CARTRIDGE FOR WATER TREATMENT DEVICE

BACKGROUND OF THE INVENTION

This invention relates to a replaceable filter cartridge for use in a gravity-fed water treatment system. In particular this invention relates to a novel structural filter cartridge for a carafe/pitcher system in an air vent facilitates water flow and in which only the carbon block is replaceable.

Carafe/pitcher water filtration systems are batch treatment and filtration devices in which water is filtered, treated and stored in a container. The treated water is discharged from a spigot on the container, providing a self-contained water treatment system. These self-contained systems typically have upper and lower chambers separated by a filter cartridge.

The water treatment process relies on gravity to force water through the filter cartridge to remove harmful contaminants from the water. The upper chamber receives untreated water to be filtered while the lower chamber receives and stores the filtered water. The water is forced through the filter cartridge by gravity.

The presence of unwanted and potentially harmful contaminants in drinking water are a cause for health concern. As such, there is a desire for water treatment devices suitable for use in the home and as portable instruments for water treatment. As a result, many water treatment devices and methods have been developed to remove contaminants or otherwise treat the water to obtain a suitable drinking water.

Some of these water treatment devices and methods utilize treatment materials, which, of their own nature, can be distasteful to consumers of the treated water. For example, municipal water treatment facilities use chlorine as an active agent to remove bacterial contaminants but the odor and taste of the treated water can be offensive. It is known to use activated carbon to treat water to remove the offensive odor and taste of chlorine-treated water, however, the flow rate of water through the activated carbon can be hampered. When the life of the carbon has been exhausted, the entire cartridge, that is the plastic housing containing the carbon is discarded along with the carbon.

In addition to chemical and particulate contaminants, several types of harmful contaminants in drinking water are a cause for health concern. Even municipal water treatment fails to adequately remove all of the hazardous contaminants. Most municipal systems use chlorine as disinfectant to remove bacteria. It is known that excess chlorine normally used by the municipality is in itself a source to create harmful chemicals commonly known as disinfectant by products, (DBP). These DBP, along with herbicides and pesticides, often present and known as volatile organic chemicals (VOCs), are harmful chemicals in the water system. Besides these volatile organic chemical contaminants, biological contaminants including protozoan cysts as *Giardia lamblia* and *Cryptosporidium*, excreted by animals, are present in certain waters.

Cysts are not easily removed by conventional oxidizing agents. Common methods of removing cysts are to trap them in a filter that has a porosity less than 2 microns. Such filters with pore sizes less than 2 microns typically are used in water purification systems that use high water line pressure.

Gravity filtration is one of the oldest ways of filtering water. Starting from a simple filter cloth to remove suspended impurities to carbon granules along with certain ion exchange media to remove chlorine and certain heavy metals, gravity filtration systems have upper and lower chambers separated by filter cartridge. The system relies on gravitational forces acting on the untreated water in the upper chamber to force the water through the cartridge and into the lower chamber to produce filtered water.

Gravity filtrations systems in residential use vary in sizes, defined by the capacity of the two chambers. One such gravity filtration system in common residential use is the carafe type of filter with the top container having a capacity less than 3 liters. The pressure of the untreated water is sufficient to force the water through a limited amount of activated carbon granules and ion exchange resins.

Replaceable filter cartridges for household use are known. In one device, a filter cartridge contains particles of activated charcoal and carbon or other suitable absorbent material. Water is filtered by passing it through the tubular wall of the cartridge from the space between the cartridge and the housing toward the inside of the tubular cartridge. The filter cartridge is generally cup-shaped and the cartridge structure provides a long flow path for water traveling from the inlet to the outlet. This provides effective odor and taste filtering of the water due to the long contact time.

In another system, a filter tube has a plurality of randomly disposed glass fibers having interstices to define the porosity of the filter. The glass fibers are bonded at the junctions of the fiber cross-overs with a hardened silicone resin bonding agent. However, the bonding agent can impart hydrophobicity to the filter and restrict the scope of the filter applications in that organic bonding agents can have a color, which darkens with sunlight and use.

Another system discloses a pass-through pitcher filter that has a compact filter element including a thin annular disk of molded granular activated carbon and a peripheral annular seal element. The seal element allows the filter to be replaceably mounted on the lower end of an upper plastic reservoir, and the reservoir is adapted to be supported in the top of a pitcher for receiving filtered water. The plastic reservoir and filter are placed on a pitcher for receiving and dispensing the treated water. This assembly relies on gravity flow of water from the reservoir to the pitcher via the filter. The seal element utilizes a synthetic rubber material and is preferably molded around the carbon filter disk.

The filter element is made from a rigid sintered block of activated granular carbon and includes a suitable binder, such as polyethylene, compressed and heated to form a molded porous block. An annular synthetic rubber seal is attached to the periphery of the carbon block. However, when the filter element is used initially or after it has remained unused for a period of time, surface tension between water in the reservoir which is to be filtered and the dry porous carbon block may inhibit normal gravity flow of the water through the filter element. To initiate flow, manual pressure is applied to a bellows element of the reservoir to compress air in the reservoir to force water through the carbon block to initiate water flow.

Yet another system includes a filter cartridge for a gravity-fed water treatment device that has a hydrophilic porous particulate filter with an interior volume filled with granular filter activated carbon, an ion exchange resin or a combination of granular carbon and resin. The porous particulate filter is microporous and has a pleated sheet filter media, and is arranged to establish with a pressure of about 0.5 pounds per square inch (psi) a flow rate of water by gravity through the filter cartridge.

Such a device has a low flow rate, which is not practical for a gravity fed water treatment device. To overcome the low flow rate, the porous particulate filter contains a hydrophilic material. Moreover, such a device does not typically remove volatile organic chemicals, and it is not capable of doing so without specified treating chemicals or materials.

Accordingly, there is a need for a water filter having improved fluid flow over known filters. Desirably such a filter has a removable filter medium adapted for field removal, cleaning, and replacement. More desirably, such a filter is capable of removing harmful chemicals known as disinfectant by-products (DBP) and volatile organic chemicals (VOC) and protozoan cysts, as well as heavy metals such as lead, cadmium and mercury. More desirable still, such a water filtering system uses carbon block filters that are bio-static such that any trapped bacteria will not multiply and grow.

BRIEF SUMMARY OF THE INVENTION

A filter cartridge for a gravity-fed water treatment device includes a cartridge shell defining an upper portion having an upper interior volume and a lower portion having a lower interior volume. The lower portion has openings therein. The shell includes a top cap having openings therein. The top cap is mounted to the lower part of the cartridge shell.

A hydrophilic carbon block having an outer wall and a central opening defining an inner wall is positioned in the shell. The carbon block has a block cap disposed on a top of the carbon block. The block cap has a central opening therein.

A sealing member extends about the cartridge shell lower portion. The sealing member supports a bottom of the carbon block. The sealing member has an opening therein aligning, at least in part, with the carbon block central opening and open to the lower interior volume.

A vent tube extends upwardly through the block cap and the top cap. The vent tube is sealed at about the block cap opening and has a vent tube outlet disposed upwardly a predetermined distance.

The filter cartridge receives a source of untreated water through the top cap openings and supplies treated water through the cartridge shell lower portion openings. The filter cartridge is disposed between the untreated water source and the treated water supply. Water flows by force of gravity through the top cap openings, through the hydrophilic carbon block from the outer wall to the central opening, and through the shell lower portion openings. Air is vented from the lower portion lower interior volume through the vent tube and the vent tube outlet. The vent outlet is located at a height greater than a maximum height of water in the filter cartridge.

An O-ring can be disposed between the vent tube and the block cap to prevent untreated water from flowing into the central opening bypassing flowing through the carbon block wall. The vent tube has an open top having a cap thereon and the vent tube outlet is one or more openings in a side wall of the vent tube.

In a preferred embodiment, the hydrophilic carbon block is formed as a cylinder having an open, longitudinal central region. The carbon block can be formed from a polymeric binder and an activated carbon powder. Preferably, the carbon block is surface treated for hydrophilicity. The polymeric binder can be, for example, an ultrahigh molecular weight polyethylene. A preferred binder has a molecular weight of about 3 million.

The carbon block can be surface treated with an anionic surfactant wetting agent, such as diethylhexyl sodium sulfosuccinate. A present block has a wall thickness measured between the outer wall of about 3 mm to 10 mm. The activated carbon powder has a mesh size of about 40×300 and preferably about 40×140.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
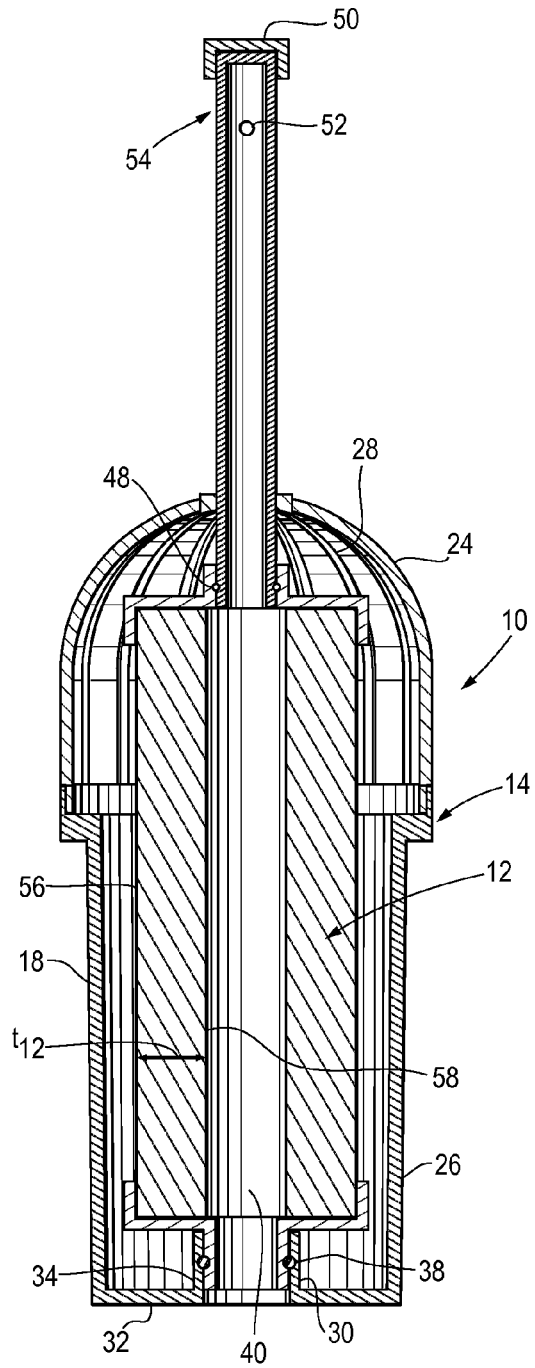
FIG. 1 is an elevational view, shown in partial section, of a filter cartridge embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Most gravity-type filtration systems for typical home use are pour through pitcher-type systems. In such a system, activated carbon granules are filled in the bottom of a cartridge to form a carbon "column" to contact the water and remove bad taste and odor. In some filter systems, ion exchange resin is added to the activated carbon to remove heavy metals.

The carbon granules are usually of mesh size of 20×50 and use about 50 grams per cartridge. This has a limited capacity and requires fairly frequent replacement in order to remain effective. In replacing these cartridges, the entire cartridge including any plastic housing or body is discarded along with the carbon filter medium.

Carbon blocks made of activated carbon powder can provide enormous surface area to remove volatile organic chemicals in addition to removing bad taste and odor. Depending on particle size and size distribution of the carbon particles, the block can be of various nominal porosities. Conventional carbon blocks are generally tubular in design, and having a central opening or bore. Water flows from the outer surface radially inwardly, through the wall into the inner bore of the carbon block. For water to flow at an acceptable rate through the carbon block, the water requires a driving force greater than gravity. As such, these systems are generally used in homes with a water line connection to provide the motive force. And, for cyst reduction ability, carbon blocks typically have a porosity of less than 2 microns.

However, in a gravity filter system, particularly the carafe type of filter it is desirable to use carbon blocks instead of carbon granules to increase the adsorption capacity of the filter. Bommi et al., U.S. Pat. No. 7,396,461, which is commonly assigned with the present application and is incorporated herein by reference, teaches a dome shaped carbon block to increase the surface area coupled with a hydrophilic surface modified binder to increase the flow rate to an acceptable level for gravity application.

Accordingly, referring to the figures, there is shown a filter system 10 that uses a carbon block 12 of tubular design positioned in a cartridge housing 14, embodying the principles of the present invention. The carbon block 12 is easily replaceable and discarded, while the plastic cartridge housing 14 is reused. In known commercially available pitchers, the cartridge including the plastic housing along with the carbon media is discarded which is not eco-friendly design.

In the present filter system 10, activated carbon powder of mesh size 40×300 is used, and preferably carbon powder having a mesh size of 40×140 and 140×200 is used in making the carbon block. Activated carbon can be manufactured from various sources, including bituminous, peat and wood. A preferred source for the carbon is coconut shell based activated carbon. Coconut shell is preferred because of its wide availability and because it is a renewable resource. One known replaceable carbon block filter is made from coconut shell based activated carbon, manufactured by and commercially available from Global Ecocarb Pvt Ltd, of India under the trademark GREENCARBON®.

In manufacture of the carbon block 12, coconut shells are charred in an environmentally friendly process, emitting no methane into the atmosphere. The carbon block 12 can be surface modified to increase its hydrophilicity. One suitable surface treatment is an anionic surfactant wetting agent, such as diethylhexyl sodium sulfosuccinate. The carbon block 12 can also be surface modified to increase its kinetics to be able to remove heavy metals such as lead, cadmium and mercury. The carbon block 12 can also be impregnated with silver to provide bio-static characteristics to prevent the growth of bacteria and the consequent fouling of the carbon.

The carbon block 12 can be formed from a hydrophilic material and can include a polymeric binder and the activated carbon powder. A suitable polymeric binder is an ultrahigh molecular weight polyethylene. Such a polymeric binder has a molecular weight of about three million molecular.

Figure 3:
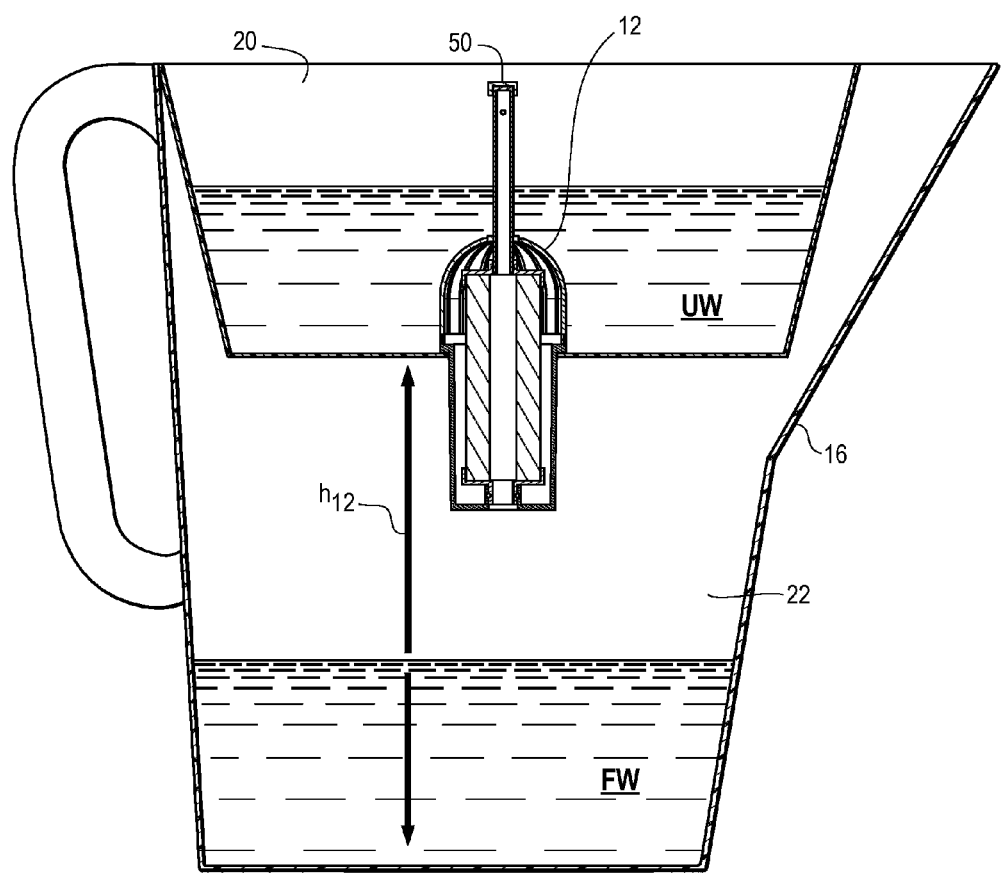
FIG. 3 is a sectional view of the filter cartridge shown in an exemplary carafe or pitcher.

FIG. 3 illustrates an assembled cartridge 18 in a pitcher or carafe 16. Water to be filtered UW is poured into the top container 20 of the pitcher 16 and filtered water FW is collected in a bottom storage container 22. The cartridge assembly 18 provides flow communication between the top container 20 and the bottom container 22.

Figure 2:
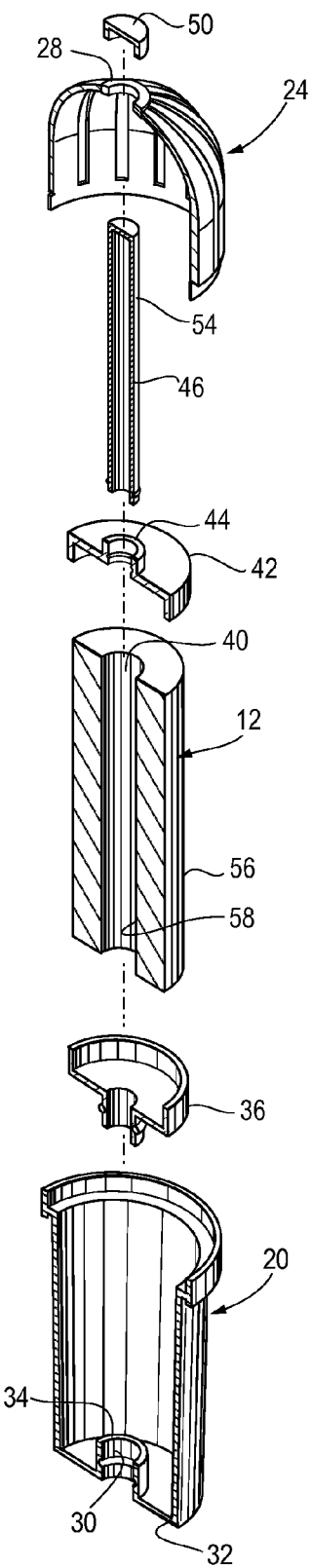
FIG. 2 is an exploded perspective view of the filter cartridge of FIG. 1.

As seen in FIGS. 1 and 2, the cartridge assembly 18 includes a plastic housing 14 having upper and lower portions, 24, 26, respectively, and in which the replaceable carbon block filter 12 is housed. The upper portion or cap 24, has openings 28, exemplary of which are the vertical slots, through which water enters the cartridge 18. The lower portion 26 is formed as a sealed unit with an opening 30 in the bottom 32. In a present unit, a collar 34 extends upwardly from the base 32 of the lower portion 26 to define the opening 30. The carbon block 12 has a bottom cap 36 made of a bio-degradable plastic. The bottom cap 36, which is sealed to the bottom of the carbon block 12, is held in place at the bottom 32 of the plastic housing 26, cooperating with the opening 30 in the bottom of the lower portion 26 by a seal 38, such as the illustrated O-ring. In this arrangement, the interior or bore 40 of the block 12 is in flow communication with the bottom storage region 22 of the pitcher 16.

The top of the carbon block filter 12 has an end cap 42 that is also made of bio-degradable plastic. The top end cap 42 has an outlet 44 and an air vent tube 46 is held in place in the outlet 44 by a seal 48, such as the exemplary O-ring. The top end cap 42 is sealed to the carbon block 12.

The air vent tube 46 is closed at the top 50 and includes a plurality of holes 52, such as pin holes at an upper end 54 of the vent tube 46. The perforated tube 46 provides a path for the escape of air that is present in the bottom container 22 that is displaced by water flowing into the bottom container 22. Without the vent path, the pressure in the bottom container 22 would increase as water enters the bottom container 22, thus providing increased resistance to water flow.

A plastic cover 24, such as the illustrated perforated cover is fitted on to the top of the lower portion 26 of the plastic housing 14. The cover 24 can be secured in place on the housing by a friction fit, a threaded or bayonet mount, or other removable mounting. In this arrangement water in the upper compartment 20 of the pitcher 16 is isolated from water in the bottom storage region 22 by the carbon block 12.

To increase the flow rate through the block 12 and to optimize the surface area over which filtration occurs, the height $h_{12}$ of the replaceable carbon block 12 is configured to occupy part of the top container 20 and part of the bottom container 22. Also to increase the flow rate it is desirable to have the water flow from the outer surface 56 of the block 12 to the inner bore 40.

Water to be filtered UW flows from the top container 20 through the openings 28 in the cover 24 and flows through the carbon filter 12. As water flows into the carbon block 12, air inside the porous block 12 is allowed to escape through the air vent tube 46. It has been found that the release of air through the vent tube 46 facilitates an increase in water flow rate through the carbon block 12. Filtered water FW then flows from out of the bore 40 (at the bottom of the block) and is collected in the bottom container 22.

When it is desired to replace the carbon block 12, the air vent tube 46 is pulled out from the top of the carbon block 12 and the cover 24 is opened. The replaceable carbon block 12 is simply pulled out of the plastic housing 14 lower section 26. In such a configuration, only the replaceable carbon block 12 is discarded and the plastic housing lower section 26, air vent tube 46 and cover 24 are re-used, greatly reducing the amount of materials that are treated as waste.

It will be appreciated by those skilled in the art that the present filter system 10 is not limited to any specific height or diameter or thickness of carbon block 12. Indeed, the dimensions of the block 12 will vary, depending upon the pitcher/carafe 16 configuration and specifications, such as, the water height in the top container 20 and the desired flow rate. In the present filter system 10, the block 12 has a wall thickness $t_{12}$ measured between the outer wall 56 and the inner wall 58 of about 3 mm to about 10 mm.

In addition, the present vented filter system 10 is not limited to a pitcher/carafe 16 application but can be used in any gravity-type system in which water to be purified flows under gravity pressure from an upper container to a lower container through the filter assembly 10.

Moreover, it will be understood that based on the impurities in the water, the size and shape of the media holding chamber in the housing 14 can be varied to increase contact and dwell time as desired to accommodate bacteria and virus eradicating media.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A filter cartridge for a gravity-fed water treatment device comprising:
    a cartridge shell defining an upper portion having an upper interior volume and a plurality of side apertures for untreated water ingress, and a lower portion having a lower interior volume, the lower portion having an opening therein for treated water egress, said cartridge shell having a predetermined length such that said upper and lower portions join at a mating point intermediate said predetermined length;
    a hydrophilic carbon block extending through the lower portion into the upper portion such that a portion of said carbon block is above said mating point and a portion of said carbon block is below said mating point, and said carbon block having an outer wall and a central opening defining an inner wall, the carbon block having a block cap disposed on a top of the carbon block, the block cap having a central opening therein;
    a sealing member extending about the cartridge shell lower portion, the sealing member supporting a bottom of the carbon block, the sealing member having an opening therein aligning, at least in part, with the carbon block central opening and open to the lower portion opening; and
    a vent tube in the upper portion that extends from the opening of the block cap through the cartridge shell upper portion, the vent tube being sealed at about the block cap opening, the vent tube having a vent tube outlet disposed upwardly a predetermined distance;
    wherein the filter cartridge receives a source of untreated water through the upper portion side apertures and supplies treated water through the cartridge shell lower portion openings, wherein the filter cartridge is configured such that untreated water is directed from the top portion through the outer and inner walls of the hydrophilic carbon block and subsequently to the lower portion via the central opening in the hydrophilic carbon block; and wherein air is vented from the lower portion lower interior volume through the vent tube and the vent tube outlet, the vent outlet being located at a height greater than a maximum height of water in the filter cartridge.

2. The filter cartridge in accordance with claim 1 including a filter sheet disposed in the cartridge shell lower portion overlying the lower portion openings.

3. The filter cartridge in accordance with claim 1 including an O-ring disposed between the vent tube and the block cap to prevent untreated water from flowing into the central opening bypassing flowing through the carbon block wall.

4. The filter cartridge in accordance with claim 1 wherein the vent tube has an open top having a cap thereon and wherein the vent tube outlet is an opening in a side wall of the vent tube.

5. The filter cartridge in accordance with claim 4 including a plurality of vent tube outlets.

6. The filter cartridge in accordance with claim 1 wherein the hydrophilic carbon block is formed as a cylinder having an open, longitudinal central region.

7. The filter cartridge in accordance with claim 1 wherein the hydrophilic carbon block is formed from a polymeric binder and an activated carbon powder, the carbon block being surface treated for hydrophilicity.

8. The filter cartridge in accordance with claim 7 wherein the polymeric binder is an ultrahigh molecular weight polyethylene.

9. The filter cartridge in accordance with claim 7 wherein the surface treatment is with an anionic surfactant wetting agent.

10. The filter cartridge in accordance with claim 9 wherein the anionic surfactant wetting agent is diethylhexyl sodium sulfosuccinate.

11. The filter cartridge in accordance with claim 7 wherein the molecular weight of the polymeric binder is three million molecular weight.

12. The filter cartridge in accordance with claim 1 wherein the carbon block has a wall thickness measured between the outer wall and the inner wall and wherein the wall thickness is about 3 mm to 10 mm.

13. The filter cartridge in accordance with claim 6 wherein the activated carbon powder has a mesh size of about 40×300.

14. The filter cartridge in accordance with claim 6 wherein the activated carbon powder has a mesh size of about 40×140.

* * * * *